No. 893,789. PATENTED JULY 21, 1908.
C. L. DYK.
MANURE SPREADER.
APPLICATION FILED JUNE 16, 1906.
2 SHEETS—SHEET 1.
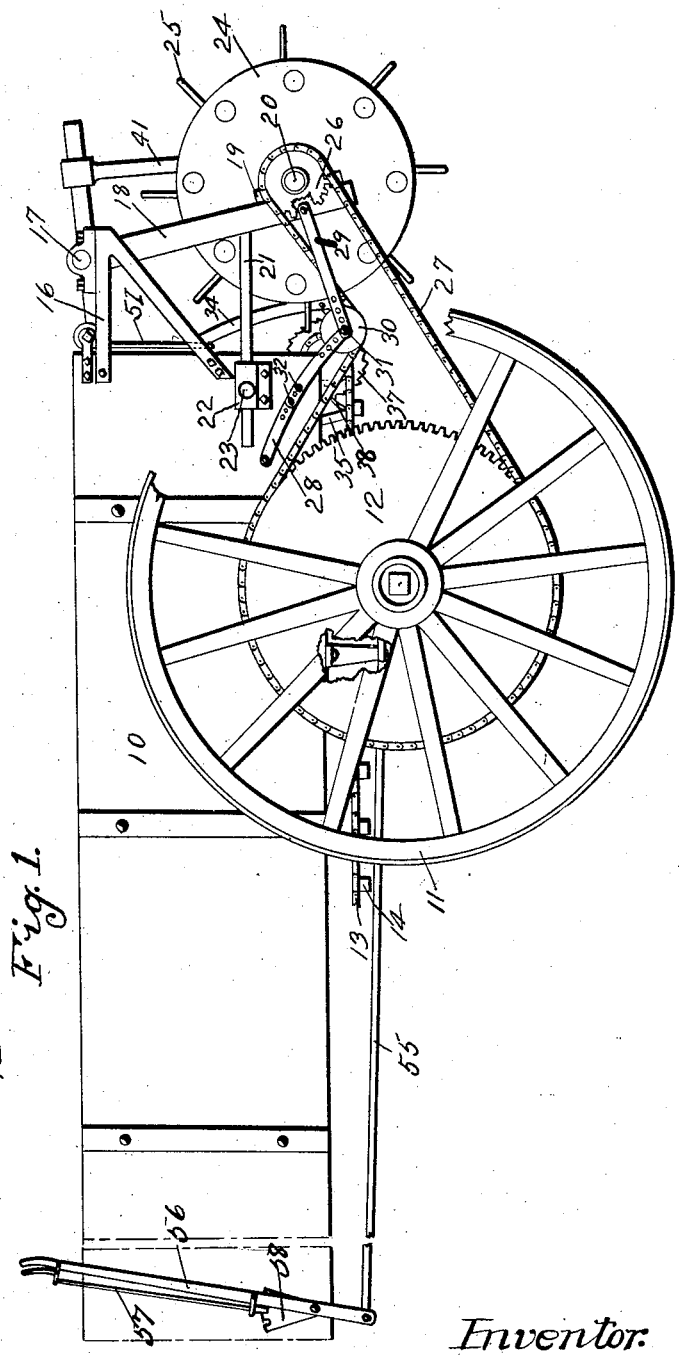
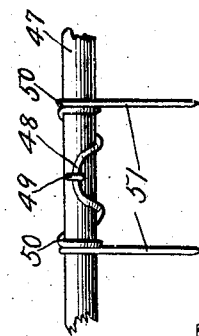
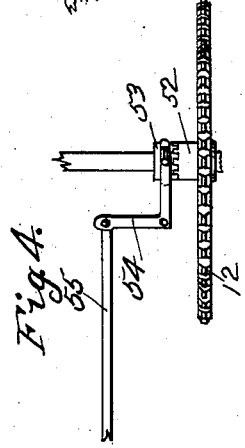
Witnesses.
K. K. Keffer.
A. G. Hague
Inventor.
Charles L. Dyk.
by Orwig & Lane Atty's

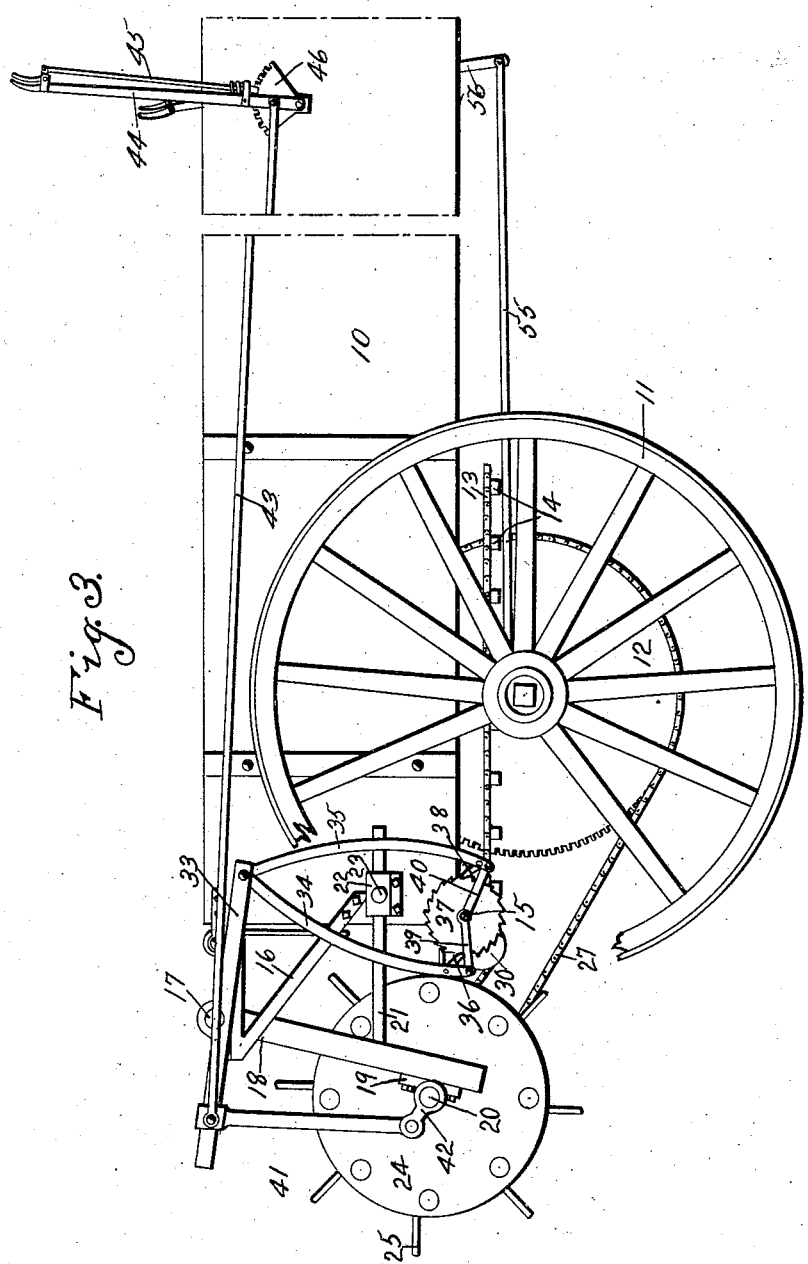

form no part of
UNITED STATES PATENT OFFICE.

CHARLES L. DYK, OF ORANGE CITY, IOWA.

MANURE-SPREADER.

No. 893,789.     Specification of Letters Patent.     Patented July 21, 1908.

Application filed June 16, 1906. Serial No. 322,327.

*To all whom it may concern:*

Be it known that I, CHARLES L. DYK, a citizen of the United States, residing at Orange City, in the county of Sioux and State of Iowa, have invented certain new and useful Improvements in Manure-Spreaders, of which the following is a specification.

The object of my invention is to provide a manure spreader of the type to be advanced over a field by draft animals, which spreader shall be simple and inexpensive in construction and capable of being advanced with comparatively slight draft, and so arranged that the manure is thrown straight downwardly from the apron to thereby avoid the necessity of using wind shields or other directing devices as in the class of spreaders in which the manure is thrown upwardly and over the cylinder.

A further object is to provide means whereby the cylinder will be automatically moved away from the discharge end of the apron in the event that a large object in the manure should strike upon the cylinder or enter between the cylinder and the discharge end of the apron.

A further object is to provide means for automatically maintaining the cylinder driving chain in condition for effective work either when the cylinder is close to the apron or moved outwardly away from it.

A further object is to provide simple, durable and inexpensive means for manually controlling the relative speed of the apron and the cylinder so that the manure may be spread more or less thickly, as desired by the operator.

My invention consists in the construction, arrangement and combination of the various parts of the device, whereby the objects contemplated are attained, as hereinafter more fully set forth, pointed out in my claims and illustrated in the accompanying drawings, in which—.

Figure 1 shows a side elevation of the rear end of a wagon body with a manure spreader embodying my invention applied thereto. Fig. 2 shows a detail view of a portion of the retarder shaft with a pair of spring retarder teeth thereon. Fig. 3 shows a side elevation of a portion of a wagon body provided with a manure spreader embodying my improvements and taken from the side opposite the view shown in Fig. 1, and Fig. 4 shows a detail view illustrating the clutch device for throwing the main sprocket wheel in and out of gear.

Referring to the accompanying drawings, I have used the reference numeral 10 to indicate the wagon body and 11 the traction wheels, one of which is provided with a sprocket wheel 12. The apron is of the ordinary type and comprises an endless chain 13 and cross pieces 14 thereon running over the sprocket wheels on a shaft 15 at the rear of the wagon bed. These parts are of the ordinary construction and form no part of my present invention.

Fixed to the sides of the wagon body and projected rearwardly from the rear end thereof are two brackets 16 to support a cross bar 17. Connected with said cross bar are two hangers 18 inclined downwardly and rearwardly and having on their lower portions the bearing boxes 19 for the cylinder shaft 20. These hangers 18 have their forward movement limited by the stops 21 adjustably mounted in the sleeves 22 where they are held by the set screws 23. Said hangers, however, are free to swing rearwardly.

Mounted on the cylinder shaft 20 is a spreading cylinder 24 having the spring teeth 25. The adjustable stops 21 are normally set in position so that the teeth 25, during their rotation, will come close to the discharge end of the apron. I have provided for rotating the cylinder as follows: On the cylinder shaft 20 is a sprocket wheel 26 connected by a chain 27 with the sprocket wheel 12. In this connection it will be noted that it is desirable to have the sprocket wheel 27 tight and without any considerable amount of slack at all times, both when the hangers 18 are at their forward limit and at their rearward limit of movement. To accomplish this desirable result I have pivoted an arm 28 to the side of the wagon body and have also pivoted an arm 29 to the adjacent hanger 18. These arms incline downwardly and toward each other, and at their adjacent ends they support a sprocket wheel 30. They are made adjustable so that they may incline downwardly more or less by having each of said arms provided with perforations, so that the bolt 31 that supports the sprocket wheel 30 may be set in any of said perforations. I have also provided for adjusting the length of the arm 28 by the use of two overlapping parts connected by the bolts 32 passed through the series of openings in said sections provided for them. The said sprocket wheel 30 engages and rests upon the top of the sprocket chain 27. Obviously, when the hangers 18 move rearwardly from the position shown in Fig. 1, the sprocket wheel 30 is elevated and the chain kept as tight as when in the position shown in said figure, and at all positions of the hangers 18, a good driving connection is maintained between the sprocket wheels 12 and 26, by the chain 27. As the chain wears or stretches, the arms 28 and 29 may be adjusted to suit the altered conditions.

I have provided for driving the apron at any desirable speed relative to the speed of the cylinder as follows: Pivoted to one end of the bar 17 is a lever 33 having at its forward end two arms 34 and 35, one of which has a pawl 36 to incline downwardly and to engage a ratchet wheel 37 on the apron driving shaft 15. The other has a pawl 38 to project upwardly and engage the opposite side of the ratchet wheel. These arms 34 and 35 are pivotally connected by the links 39 and 40 with the shaft 15 to thereby hold the pawls in operative contact with the ratchet wheel during the up and down movements of the arms 34 and 35. Slidingly mounted on the other end of the lever 33 is a pitman 41 connected to a short crank arm 42 on the cylinder shaft 20. Connected with the upper end of the pitman 41 is a rod 43 pivoted to a lever 44 near the front of the wagon box. This lever is provided with a spring actuated pawl 45 to engage a sector 46, whereby the lever may be locked in various positions. By means of this arrangement, a rotation of the spreading cylinder will alternately raise and lower the lever 33 by means of the crank arm 42 and pitman 41, and this will cause the pawls 36 and 38 to rotate the shaft 15 in the proper direction for advancing the apron toward its delivery end. If the lever 44 is moved to its forward limit, then the length of travel of the pawls 36 and 38 is increased and the apron will be advanced at its maximum speed with relation to the speed of the cylinder, or as the lever 44 is moved rearwardly, a shorter stroke will be imparted to the pawls and the apron will be advanced more slowly. If the lever 44 is set to its extreme rearward limit, the movement imparted to the lever 33 will be so slight that the pawls will not advance the ratchet wheel an entire tooth space on each stroke, and hence the apron will not be driven at all, so that the single lever 44 controls the starting and stopping of the apron and also controls the relative speed of the travel of the apron and cylinder. Extended across the rear of the wagon box is a stationary retarder bar 47 supporting a series of spring teeth which extend straight downwardly in front of the cylinder. These teeth are made in pairs out of a single piece of spring wire, and each pair comprises a central portion 48 secured by the staple 49 to the retarder bar 47, and having a coil 50 at each side with the end portions 51 forming the retarding teeth and projecting straight downwardly from the coils 50. In this connection it is to be noted that teeth of the same kind may be used to advantage as the teeth of the spreader.

I have provided for throwng the main sprocket wheel 12 in and out of gear as follows: Said sprocket wheel is rotatably mounted upon the main axle and is provided with a clutch member 52. Slidingly mounted on the main axle adjacent to said clutch member is a mating clutch member 53 controlled by a lever 54 to which is attached a rod 55. The forward end of this rod is connected to a lever 56 which is provided with a pawl 57 to engage a sector 58, so that, by a manipulation of said lever, the clutches may be held in position in engagement with each other or may be held separated.

In practical operation and assuming the device to be operating under the conditions of actual use, the cylinder teeth will engage the manure at the discharge end of the apron and thoroughly separate and throw it straight downwardly and rearwardly toward the ground. If a hard and unyielding mass in the manure should be advanced to the discharge end of the apron, then the cylinder teeth will strike it and the cylinder will swing rearwardly far enough to permit said object to pass. When the cylinder swings rearwardly in this manner, the chain 37 will elevate the sprocket wheel 31 so that the chain will be no tighter than when the cylinder is at its forward limit. The weight of the cylinder on the rearwardly inclined hangers is sufficient to hold it, with proper pressure, toward the discharge end of the apron and the stops 21 prevent the same from striking the apron. The spring toothed retarder bar aids in maintaining the load within the wagon box and keeps it from falling out on top of the cylinder, and if the wagon box should be loaded unevenly, these teeth will tend to spread and even up the top of the load as the load is being discharged.

It is obvious that my invention is of very simple construction and few parts, and that it may be advanced over a field with comparatively light draft because of the direction in which the cylinder runs, thus avoiding the necessity of throwing the manure upwardly and rearwardly over the cylinder, as considerable power is necessarily required to raise and throw manure in this manner while a very small amount of power is sufficient to tear the manure apart from the discharge end of the apron and throw it downwardly toward the ground. Furthermore all danger of breaking the operative parts on account of feeding the material to the cylinder faster than the cylinder is able to carry it away is avoided, because no matter how fast the apron feeds manure to the spreading cylinder, clogging of the cylinder will be avoided because it will simply swing rearwardly and permit the surplus material to drop to the ground. The operator may easily control the amount of manure being handled by the machine by means of the lever 44.

Having thus described my invention, what I claim and desire to secure by Letters Patent of the United States, therefor is—

1. In a manure spreader, the combination of a wagon body, hangers pivoted thereto and extended downwardly and away from the body and a spreading cylinder mounted on said hangers to be normally held by gravity toward the discharge end of the wagon body.

2. In a manure spreader, the combination of a wagon body, of hangers pivoted thereto and extended downwardly and away from the body, a spreading cylinder mounted on said hangers to be normally held by gravity toward the discharge end of the wagon body and stops for limiting the movement of the hangers toward the wagon body.

3. In a manure spreader, the combination of a wagon body, hangers pivoted thereto and extended downwardly and away from the body, a spreading cylinder mounted on said hangers to be normally held by gravity toward the discharge end of the wagon body and adjustable stops for limiting the movement of the hangers toward the wagon body.

4. In a manure spreader, the combination of a wagon body, hangers pivoted thereto and extended downwardly and away from the body, a spreading cylinder mounted on said hangers to be normally held by gravity toward the discharge end of the wagon body and means for rotating the spreading cylinder in a direction with its forward portion moving downwardly adjacent to the discharge end of the wagon body.

5. In a manure spreader, the combination of a wagon body and a spreading cylinder yieldingly supported at the discharge end thereof capable of being moved away from the body by a pressure of the load thereon and of automatically returning when said pressure is removed and means for rotating the cylinder when in any position of its movement.

6. In a manure spreader, a wagon body, traction wheels, a sprocket wheel mounted for rotation with one of the traction wheels, a spreading cylinder supported adjacent to the discharge end of the wagon body and capable of movement to and from said end, a sprocket wheel connected with the cylinder, a chain passing around said wheels and a chain tightener comprising a sprocket wheel to engage a part of the chain between the sprocket wheels, two arms pivoted respectively to the wagon body and to the movable supports of the cylinder, said arms extended downwardly and toward each other and connected with said sprocket wheel.

7. In a manure spreader, a wagon body, traction wheels, a sprocket wheel mounted for rotation with one of the traction wheels, a spreading cylinder supported adjacent to the discharge end of the wagon body and capable of movement to and from said end, a sprocket wheel connected with the cylinder, a chain passing around said wheels, and a chain tightener comprising a sprocket wheel to engage a part of the chain between the sprocket wheels, two arms pivoted respectively to the wagon body and to the movable supports of the cylinder, said arms extended downwardly and toward each other and adjustably connected with said sprocket wheel.

8. In a manure spreader, a wagon body, a traction wheel, a sprocket wheel operatively connected with the traction wheel, pivoted hangers supported at the rear end of the wagon body and inclined downwardly and rearwardly, a spreading cylinder supported at their lower ends, a sprocket wheel connected with said cylinder, a chain passed around said sprocket wheels in a direction tending to move the forward portion of the cylinder downwardly during its rotation, an adjustable arm pivoted to the wagon body extended downwardly and rearwardly, an arm pivoted to one of the hangers and extended downwardly and forwardly and adjustably connected with the other arm and a sprocket wheel supported by said arms and engaging the top portion of the chain between the sprocket wheels.

9. In a manure spreader, a wagon body, a traction wheel, a sprocket wheel operatively connected with the traction wheel, pivoted hangers supported at the rear end of the wagon body and inclined downwardly and rearwardly, a spreading cylinder supported at their lower ends, a sprocket wheel connected with said cylinder, a chain passed around said sprocket wheels in a direction tending to move the forward portion of the cylinder downwardly during its rotation, an adjustable arm pivoted to the wagon body extended downwardly and rearwardly, an arm pivoted to one of the hangers and extended downwardly and forwardly and adjustably connected with the other arm, a sprocket wheel supported by said arms and engaging the top portion of the chain between the sprocket wheels, and a retarder bar at the rear end of the wagon body having spring teeth extending downwardly in front of the upper portion of the spreading cylinder.

10. In a manure spreader, the combination of a wagon body and a spreading cylinder yieldingly supported at the discharge end thereof capable of being moved away from the body by a pressure of the load thereon and of automatically returning when said pressure is removed, a sprocket wheel connected with the cylinder, a sprocket chain
5 thereon driven from one of the supporting wheels of the wagon body and an automatic chain tightener designed to maintain said chain taut when the spreading cylinder is in any position of its movement.

CHARLES L. DYK.

Witnesses:
  HENRY K. BEKMAN,
  JNO. CAMBRIE.